United States Patent
Ryou et al.

(10) Patent No.: US 10,756,402 B2
(45) Date of Patent: Aug. 25, 2020

(54) ZINC-AIR SECONDARY BATTERY

(71) Applicant: E.M.W. ENERGY CO., LTD., Seoul (KR)

(72) Inventors: Byoung Hoon Ryou, Seoul (KR); Jae Kyung Kong, Seoul (KR)

(73) Assignee: E.M.W. ENERGY CO., LTD., Seoul (KR)

( * ) Notice: Subject to any disclaimer, the term of this patent is extended or adjusted under 35 U.S.C. 154(b) by 145 days.

(21) Appl. No.: 16/077,600

(22) PCT Filed: Feb. 8, 2017

(86) PCT No.: PCT/KR2017/001361
§ 371 (c)(1),
(2) Date: Aug. 13, 2018

(87) PCT Pub. No.: WO2017/138739
PCT Pub. Date: Aug. 17, 2017

(65) Prior Publication Data
US 2019/0044204 A1 Feb. 7, 2019

(30) Foreign Application Priority Data

Feb. 12, 2016 (KR) .................. 10-2016-0016470

(51) Int. Cl.
*H01M 12/08* (2006.01)
*H01M 4/134* (2010.01)
(Continued)

(52) U.S. Cl.
CPC .......... *H01M 12/08* (2013.01); *H01M 4/134* (2013.01); *H01M 8/102* (2013.01); *H01M 10/04* (2013.01); *Y02E 60/128* (2013.01)

(58) Field of Classification Search
None
See application file for complete search history.

(56) References Cited

U.S. PATENT DOCUMENTS

| 5,560,999 A * | 10/1996 | Pedicini | H01M 6/50 429/407 |
| 2012/0200253 A1* | 8/2012 | Ryou | H01M 2/0255 320/107 |
| 2013/0216921 A1* | 8/2013 | Maloney | H01M 10/44 429/403 |

FOREIGN PATENT DOCUMENTS

| JP | 06-223885 A | 8/1994 |
| KR | 10-2011-0037567 A | 4/2011 |

(Continued)

OTHER PUBLICATIONS

International Search Report for PCT/KR2017/001361 dated May 29, 2017.

(Continued)

*Primary Examiner* — Eli S Mekhlin
(74) *Attorney, Agent, or Firm* — The PL Law Group, PLLC

(57) ABSTRACT

A zinc-air secondary battery includes an air positive electrode part, a separator, and a zinc gel negative electrode part in a case, provided with an air flow guiding part, disposed in one area of the case, for guiding the inflow of air to the air positive electrode part when discharging and for guiding the discharge of air when charging. When discharging, the inflow of air is guided to an air positive electrode part so that discharging performance (discharging output) can be improved by pressing, and when charging, discharging of air including oxygen present in the zinc-air secondary battery is guided and promoted by pressing inside the zinc-air secondary battery so that charging performance can be improved.

6 Claims, 2 Drawing Sheets

(51) Int. Cl.
*H01M 8/102* (2016.01)
*H01M 10/04* (2006.01)

(56) References Cited

FOREIGN PATENT DOCUMENTS

| | | |
|---|---|---|
| KR | 10-2012-0070729 A | 7/2012 |
| KR | 10-2012-0087420 A | 8/2012 |
| KR | 10-2013-0055635 A | 5/2013 |
| WO | WO 94/25991 A2 | 11/1994 |

OTHER PUBLICATIONS

Notice of Allowance dated Nov. 13, 2017 from Korean Patent Office in a counterpart Korean Patent Application No. 10-2016-0016470 (all the cited references are listed in this IDS.) (English translation is submitted herewith.).

* cited by examiner

ZINC-AIR SECONDARY BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/001361, filed Feb. 8, 2017, which claims priority to the benefit of Korean Patent Application No. 10-2016-0016470 filed in the Korean Intellectual Property Office on Feb. 12, 2016, the entire contents of which are incorporated herein by reference.

Technical Field

The present invention relates to a zinc-air secondary battery that is capable of improving discharging performance or charging performance according to a charging and discharging aspect.

Background

An electrochemical power source is a device in which electric energy can be generated by an electrochemical reaction, and to which a zinc-air secondary battery also corresponds. The zinc-air secondary battery employs a zinc gel negative electrode part made of a zinc gel to be converted into a zinc oxide during discharging and an air positive electrode part having a shape of a layer that is a permeable layer including water molecules and in contact with oxygen present in the air to generate hydroxyl ions.

Such a zinc-air secondary battery has many advantages compared to a hydrogen fuel battery according to the related art. In particular, because a rich fuel such as zinc (Zn) is present as metal or an oxide thereof, the supply of energy supplied from the zinc-air secondary battery is not visibly depleted. Also, hydrogen fuel batteries according to the related art are required to be re-filled, whereas the zinc-air secondary battery can be electrically re-charged and used and can transmit a higher output voltage of 1.4V than general fuel batteries having a voltage of less than 0.8V.

Accordingly, in the zinc-air secondary battery that is chargeable/dischargeable, as discharging is carried out, Zn of the zinc gel negative electrode part gradually becomes a zinc oxide, and during charging, oxygen present in the zinc oxide is separated and discharged and returns to original zinc. That is, when discharging is sufficiently performed, the higher the oxygen-discharging efficiency of the zinc gel negative electrode part, the higher the charging performance of the zinc-air secondary battery.

Thus, in order to develop a zinc-air secondary battery having both improved discharging performance (discharging output) and charging performance, it is significant to develop a zinc-air secondary battery that satisfies the above two conditions.

SUMMARY

The present invention is directed to providing a zinc-air secondary battery having improved discharging performance (discharging output) and charging performance.

One aspect of the present invention provides a zinc-air secondary battery, and more particularly, a zinc-air secondary battery, which comprises an air positive electrode part, a separator, and a zinc gel negative electrode part in a case, provided with an air flow guiding part, disposed in one area of the case, for guiding the inflow of air to the air positive electrode part when discharging and for guiding the discharge of air when charging.

A zinc-air secondary battery according to the present invention includes an air flow guiding part. Thus, when discharging, the inflow of air is guided to an air positive electrode part so that discharging performance (discharging output) can be improved by pressing, and when charging, discharging of air including oxygen present in the zinc-air secondary battery is guided and promoted by pressing inside the zinc-air secondary battery so that charging performance can be improved.

DETAILED DESCRIPTION

Figure 1:
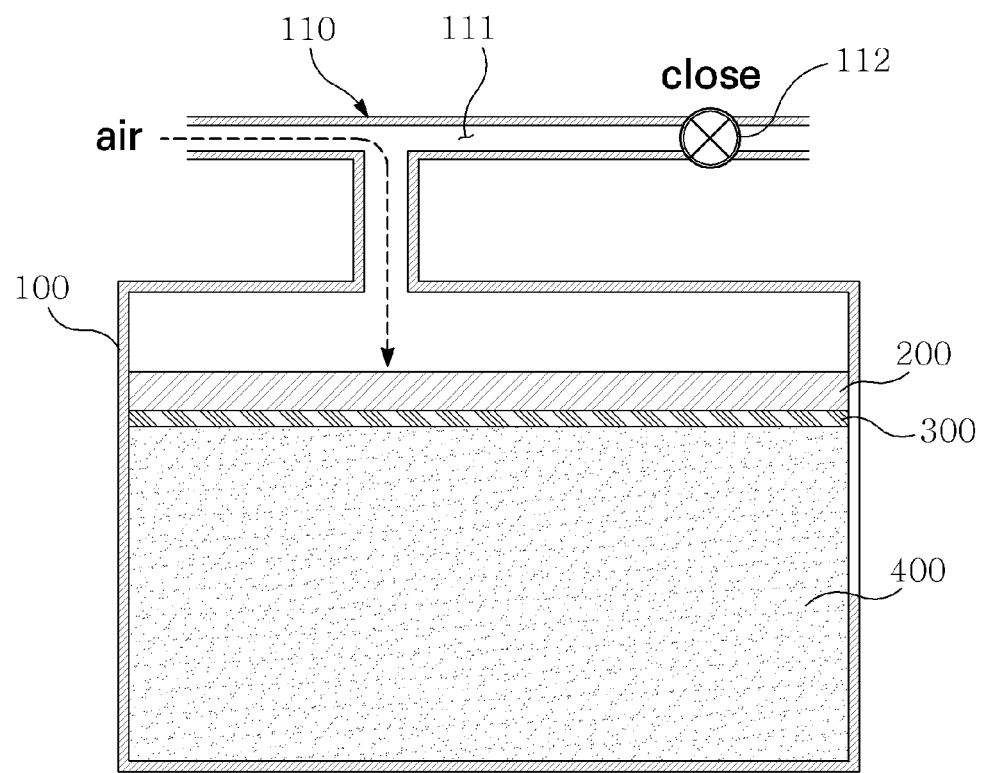
FIG. 1 is a conceptual view of a structure of a zinc-air secondary battery according to the present invention when the zinc-air secondary battery according to the present invention is discharged.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

The terminology used herein is for the purpose of describing particular embodiments only and is not intended to be limiting to the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, and/or groups thereof but do not preclude the presence or addition of one or more other features, integers, steps, operations, elements, components, and/or groups thereof.

While such terms as "first," "second," etc., may be used to describe various components, such components must not be limited to the above terms. The above terms are used only to distinguish one component from another.

The present invention relates to a zinc-air secondary battery, and more particularly, to a zinc-air secondary battery, which includes an air positive electrode part, a separator, and a zinc gel negative electrode part in a case, provided with an air flow guiding part, disposed in one area of the case, for guiding the inflow of air to the air positive electrode part when discharging and for guiding the discharge of air when charging.

In the present invention, the air positive electrode part includes an air diffusion layer, a catalyst active layer, and a positive electrode collector layer, as generally known, and preferably, the air diffusion layer may be formed of a hydrophobic layer material, such as polytetrafluoroethylene (PTFE), so as to extend a life-span of the zinc-air secondary battery by preventing moisture and carbon dioxide ($CO_2$) in external air from being introduced into the zinc-air secondary battery, and the catalyst active layer is formed of a carbon material that causes a reaction of the following Formula 1 by reacting with introduced oxygen, and preferably, the positive electrode collector layer that collects electrons generated by the chemical reaction of the catalyst active layer may have a mesh structure formed of a conductive material, such as metal.

$$O_2+2H_2O+4e^- \leftrightarrow 4OH^-$$ [Formula 1]

In the present invention, because the separator that is interposed between the air positive electrode part and the zinc gel negative electrode part so as to prevent a short circuit between the air positive electrode part and the zinc gel negative electrode part, is required to transmit hydroxyl ions generated by a chemical reaction with oxygen present in the catalyst active layer of the air positive electrode part to the zinc gel negative electrode part, preferably, the separator may be formed of a material having ion permeability, such as polypropylene.

In the present invention, the zinc gel negative electrode part that includes a zinc gel having a shape of a gel in which zinc (Zn) and an electrolyte are mixed with each other, causes a reaction of the following Formula 2 and functions as a negative electrode.

$$Zn+2OH^- \leftrightarrow Zn(OH)_2+2e^-$$

$$Zn+OH^- \leftrightarrow ZnO+H_2O+2e^-$$ [Formula 2]

Through the reaction of the above Formula 2, water molecules are generated in the zinc gel negative electrode part, and the water molecules generated through the reaction are moved to the air positive electrode part and are used in the chemical reaction of the above Formula 1.

The zinc-air secondary battery according to the present invention, preferably, includes therein at least one middle layer made of mesh or foam and may promote discharging of oxygen that is present in the zinc gel negative electrode part due to the structural characteristics. Thus, oxygen-discharging efficiency can be improved compared to the zinc-air secondary battery according to the related art, which is directly connected to improvements in the charging performance of the zinc-air secondary battery.

In the present invention, the air flow guiding part is formed in one area of the case, and when discharging, the inflow of air is guided to the air positive electrode part so that discharging performance (discharging output) can be improved by pressing, and when charging, discharging of air including oxygen present in the zinc-air secondary battery is guided so that charging performance can be improved by pressing in the zinc-air secondary battery.

The air flow guiding part may have a structure in which the flow of air can be changed according to a charging and discharging aspect, and for example, may have a structure including: an air flow part in which air flows; and a valve part, which is formed in one area of an outlet of the air flow part and configured to maintain a closed state when discharging and to maintain an opened state when charging. That is, when the zinc-air secondary battery according to the present invention is in a discharged state, the valve part formed in one area of the outlet of the air flow part is maintained in a closed state to guide the flow of air so that air introduced from an inlet of the air flow part is introduced into the case, and conversely, when the zinc-air secondary battery according to the present invention is in a charged state, the valve part formed in one area of the outlet of the air flow part is maintained in an opened state so that air introduced from the inlet of the air flow part is not introduced into the case but directly flows into the outlet of the air flow part and is discharged to the outside. In this case, pressure in the zinc-air secondary battery is reduced so that air including oxygen present in the case is suctioned into the flow of air of the air flow part and is discharged to the outside (principle of Bernoulli).

In the air flow guiding part, preferably, the air flow part may have a structure including an air inflow part into which air is introduced, an air discharge part from which air is discharged, and a communicating part coupled to the case of the zinc-air secondary battery so as to communicate with an inside of the zinc-air secondary battery, for example, a 'T'-shaped tubular structure.

In addition, preferably, the air flow part may include a fan formed in one area thereof and configured to promote flow of air. That is, due to driving of the fan, when discharging, inflow of air to the air positive electrode part of the zinc-air secondary battery can be further promoted so that a discharging output can be improved, and when charging, discharge of air including oxygen in the zinc-air secondary battery is promoted so that charging performance can be further improved.

Hereinafter, for understanding of the present invention, an example illustrated in the drawings will be described. However, the example illustrated in the following drawings is just an example for explaining the present invention, and the scope of the invention is not limited thereby.

FIG. 1 is a conceptual view of a structure of a zinc-air secondary battery when the zinc-air secondary battery according to the present invention is discharged. Referring to FIG. 1, the zinc-air secondary battery according to an embodiment of the present invention includes an air positive electrode part 200 and a zinc gel negative electrode part 400 in a case 100, and a separator 300 is interposed between the air positive electrode part 200 and the zinc gel negative electrode part 400.

An air flow guiding part 110 is formed in one area of the case 100, and the air flow guiding part 110 includes an air flow part 111 having a 'T'-shaped tubular structure in which air flows, and a valve part 112 formed in one area of an outlet of the air flow part 111 and capable of being opened/closed. Referring to FIG. 1, when the zinc-air secondary battery according to the present invention is charged, the valve part 112 is maintained in a closed state so that air introduced into the air flow part 111 is introduced into the air positive electrode part 200 within the case 100 and is pressed and thus a discharging output of the zinc-air secondary battery can be improved. In particular, when a fan (not shown) is formed at an inlet of the air flow part 111, inflow of air into the air positive electrode part 200 within the case 100 can be further promoted so that a discharging output of the zinc-air secondary battery can be further improved.

Figure 2:
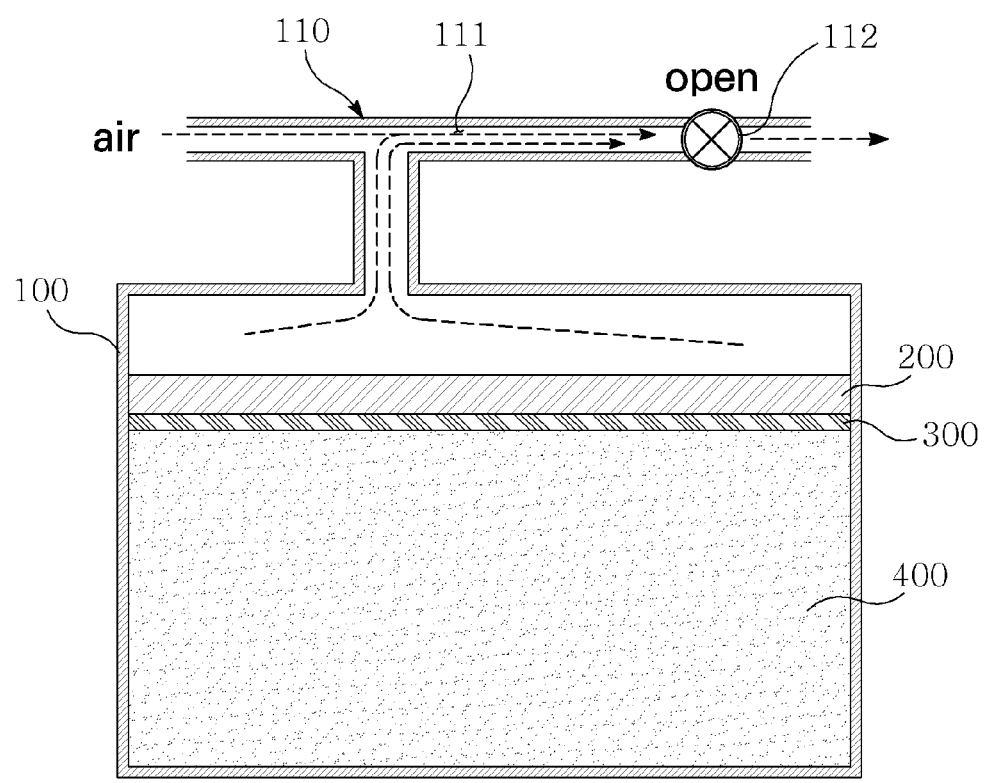
FIG. 2 is a conceptual view of a structure of a zinc-air secondary battery according to the present invention when the zinc-air secondary battery according to the present invention is charged.

FIG. 2 is a conceptual view of a structure of a zinc-air secondary battery when the zinc-air secondary battery according to the present invention is charged. The structure of the zinc-air secondary battery of FIG. 2 is basically the same as that of FIG. 1 except that the valve part 112 is maintained in an opened state.

As illustrated in FIG. 2, the valve part 112 is maintained in the opened state so that the flow of air introduced into the air flow part 111 can be directly guided to an outlet of the air flow part. In this case, due to the principle of Bernoulli, pressure in the case 100 is reduced so that air including oxygen present in the case 100 is suctioned into the flow of air of the air flow part 111 so that discharging of oxygen in the zinc-air secondary battery can be promoted. Thus, charging performance of the zinc-air secondary battery can be improved. In FIG. 2, when a fan (not shown) is formed at the inlet of the air flow part 111, discharging of oxygen in the case 100 can be promoted so that charging performance of the zinc-air secondary battery can be further improved.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A zinc-air secondary battery comprising:
   a case having an upper part and a lower part;
   an air positive electrode in the case, wherein there is a space between the air positive electrode and the upper part of the case;
   a zinc gel negative electrode in the case;
   a separator between the air positive electrode and the zinc gel negative electrode;
   an air flow guide having a T-shaped tubular structure, wherein a lower foot of the T-shaped tubular structure is intercommunicated with the space between the air positive electrode and the upper surface of the case and an upper part of the T-shaped tubular structure has an inlet and outlet at ends thereof; and
   a valve formed in the outlet to close and open the outlet.

2. The zinc-air secondary battery of claim 1, further comprising a fan formed in the upper part of the T-shaped tubular structure to promote a flow of air.

3. The zinc-air secondary battery of claim 1, wherein the zinc gel negative electrode comprises at least one middle layer formed of mesh or foam.

4. A zinc-air secondary battery comprising:
   a case;
   an air positive electrode in the case;
   a zinc gel negative electrode in the case;
   a separator interposed between the air positive electrode part and the zinc gel negative electrode;
   an air flow guide for guiding an inflow of air to the air positive electrode when discharging and for guiding a discharge of air when charging, the air flow guide comprising an air flow part in which the air flows, the air flow part having a 'T'-shaped tubular structure, wherein both ends of an upper part of the 'T'-shaped tubular structure are inlet and outlet of the air flow part, and a lower foot part of the 'T'-shaped tubular structure is connected to the case to be intercommunicated with an inner space of the case; and
   a valve formed in the outlet to maintain a closed state when discharging and configured to maintain an opened state when charging.

5. The zinc-air secondary battery of claim 4, wherein the air flow part includes a fan formed in the air flow part and configured to promote a flow of the air.

6. The zinc-air secondary battery of claim 4, wherein the zinc gel negative electrode comprises therein at least one middle layer formed of mesh or foam.

* * * * *